(12) United States Patent
Robertson et al.

(10) Patent No.: US 10,018,076 B2
(45) Date of Patent: Jul. 10, 2018

(54) MODULAR MOUNT ASSEMBLY

(71) Applicant: UNITED TECHNOLOGIES CORPORATION, Farmington, CT (US)

(72) Inventors: Thomas J. Robertson, Glastonbury, CT (US); Marc R. Sauerhoefer, Coventry, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 301 days.

(21) Appl. No.: 14/765,486

(22) PCT Filed: Dec. 18, 2013

(86) PCT No.: PCT/US2013/076038
§ 371 (c)(1),
(2) Date: Aug. 3, 2015

(87) PCT Pub. No.: WO2014/143288
PCT Pub. Date: Sep. 18, 2014

(65) Prior Publication Data
US 2015/0377070 A1 Dec. 31, 2015

Related U.S. Application Data

(60) Provisional application No. 61/798,222, filed on Mar. 15, 2013.

(51) Int. Cl.
F01D 25/24 (2006.01)
F01D 25/28 (2006.01)
F02C 7/32 (2006.01)
F16B 11/00 (2006.01)
F16L 3/08 (2006.01)

(52) U.S. Cl.
CPC ............. F01D 25/28 (2013.01); F01D 25/24 (2013.01); F02C 7/32 (2013.01); F16B 11/006 (2013.01); F16L 3/08 (2013.01); F05D 2220/32 (2013.01); F05D 2230/60 (2013.01); F05D 2260/30 (2013.01)

(58) Field of Classification Search
CPC ...... F01D 25/28; F01D 25/24; F05D 2220/32; F05D 2230/60; F16B 11/006; F16L 3/08
See application file for complete search history.

(56) References Cited

U.S. PATENT DOCUMENTS

| 4,001,921 | A |   | 1/1977 | Lawlor et al. |
| 4,318,375 | A | * | 3/1982 | Sauer ............... F01M 11/02 123/195 R |
| 4,447,934 | A | * | 5/1984 | Anscher ............ F16L 3/233 24/16 PB |
| 4,609,171 | A |   | 9/1986 | Matsui |

(Continued)

OTHER PUBLICATIONS

International Search Report Application No. PCT/US2013/076038; dated Apr. 28, 2014.

Primary Examiner — Mark Laurenzi
Assistant Examiner — Shafiq Mian
(74) Attorney, Agent, or Firm — Cantor Colburn LLP

(57) ABSTRACT

A mount assembly is described. The mount assembly may comprise a base unit having a surface, an extension unit stacked on and connected to the surface, and a clamp unit stacked on and connected to the extension unit.

15 Claims, 8 Drawing Sheets

(56) References Cited

U.S. PATENT DOCUMENTS

| | | | |
|---|---|---|---|
| 5,615,851 A * | 4/1997 | LeBeau | F16B 2/185 |
| | | | 248/73 |
| 5,992,802 A | 11/1999 | Campbell | |
| 6,149,109 A * | 11/2000 | Stankowski | F16L 3/2334 |
| | | | 24/16 PB |
| 7,097,142 B1 * | 8/2006 | Schmidt | F16L 3/12 |
| | | | 248/68.1 |
| 8,066,250 B2 * | 11/2011 | Vukadin | F16B 21/088 |
| | | | 248/562 |
| 8,262,156 B2 * | 9/2012 | Fabiilli | H02G 3/0437 |
| | | | 296/208 |
| 9,353,890 B2 * | 5/2016 | Dickinson | F16L 3/08 |
| 2005/0196121 A1 * | 9/2005 | Lohr | B64C 1/406 |
| | | | 385/136 |
| 2007/0001062 A1 | 1/2007 | Kirby | |
| 2008/0105796 A1 | 5/2008 | Nix et al. | |
| 2009/0218451 A1 * | 9/2009 | Lundborg | F16L 5/02 |
| | | | 248/56 |
| 2010/0294896 A1 * | 11/2010 | Sayilgan | B64C 1/406 |
| | | | 248/73 |
| 2011/0303456 A1 * | 12/2011 | Blanchard | F16L 3/1091 |
| | | | 174/480 |
| 2012/0137494 A1 | 6/2012 | Deterre et al. | |
| 2013/0092803 A1 * | 4/2013 | Fujiwara | B60R 16/0215 |
| | | | 248/74.2 |
| 2013/0126681 A1 * | 5/2013 | Greenfield | F16L 3/11 |
| | | | 248/62 |

\* cited by examiner

MODULAR MOUNT ASSEMBLY

CROSS-REFERENCE TO RELATED APPLICATION

This patent application is a US National Stage under 35 U.S.C. § 371, claiming priority to International Application No. PCT/US2013/076038 filed on Dec. 18, 2013, which claims priority under 35 U.S.C. § 119(e) to U.S. Patent Application Ser. No. 61/798,222 filed on Mar. 15, 2013.

FIELD OF THE DISCLOSURE

The present disclosure generally relates to mounting structures for cable harnesses and, more specifically, relates to a modular building block system for mounting cable harnesses of a gas turbine engine.

BACKGROUND OF THE DISCLOSURE

Aircraft electrical systems are important for providing the electrical power needed for the operation of the aircraft, as well as for supplying power for passenger services such as cabin lighting and entertainment systems. Aircraft electrical systems may also consist, in part, of numerous electrical cable harnesses composed of electrical wires that transmit input and output signals that govern the electrical operations of the aircraft engine. Such cable harnesses are frequently mounted and secured to larger support structures of the gas turbine engine, such as the outer surface of the fan case and/or other structures, in a cable harness routing configuration.

Importantly, cable harness routing configurations are specifically designed to direct the electrical wires to their respective terminals, protect the cable harnesses against vibrations and abrasions, optimize the usage of space in the engine, and meet aircraft engine design requirements. Aircraft engine design requirements set standards relating to cable harness mounting and routing arrangements that help to ensure that there is sufficient clearance between the electrical cable harnesses and other engine structures so that electrical cables are protected from damage, and electrical signal integrity is maintained at all times. These standards establish minimum height requirements for the mounted cable harnesses (i.e, the distance between the supporting engine structure and the cable harnesses), minimum requirements for the number of supports per unit length of the cable harnesses are required in order to satisfy cable harness weight distribution standards, as well as clearance requirements regarding the minimal distance between the cable harnesses and other structures of the aircraft engine.

In order to secure electrical cable harnesses to the outer surfaces of gas turbine engine structures and to mount them at a certain height above such structures in a routing configuration that meets such aircraft engine design requirements, known approaches utilize a complex metallic brackets, clamps, and fasteners. For example, US Patent Application Number 2007/0001062 discloses utilizing a clamping device, for grasping the cable harness, that is fixedly attached to a metallic bracket that secures the clamping device and the cable harness to the outer casing of a gas turbine engine component while supporting the clamped portion of the cable harness at a fixed distance above the gas turbine engine component.

A typical cable harness routing configuration in a gas turbine engine often involves the turning or wrapping of different cable harnesses, frequently having varying diameters, around one or more engine support structures, as well as the branching and the coming together of different cable harnesses at different locations in the routing configuration. Given that cable harnesses require a support for every specified unit of cable harness length in the routing configuration, such variations in cable harness diameters and turning angles at different locations in the routing configuration often precludes the possibility of employing a single clamping device and/or metallic bracket design for securing the cable harnesses to the support structures. Moreover, variations in clearance requirements depending on the location in the routing configuration may further preclude the possibility of employing a single metallic bracket design. As such, clamping devices and metallic brackets are frequently custom designed to accommodate variations in cable harness turning, cable harness diameters, and varying cable harness clearance requirements in the routing configuration. Therefore, a significant drawback related to the use of metallic brackets and/or clamping devices as cable harness mounting structures is the design complexity of the customized mounting parts, as well as the high part number count and associated costs.

Clearly, a system is needed that simplifies mounting structures used for cable harness routing in aircraft engines in order to reduce part design complexity, part count, and associated costs.

SUMMARY OF THE DISCLOSURE

In accordance with one aspect of the present disclosure, a mount assembly is disclosed. The mount assembly may comprise a base unit having a surface and an extension unit stacked on and connected to the surface. The mount assembly may further comprise a clamp unit stacked on and connected to the extension unit.

In another refinement, the mount assembly may further include a plurality of extension units.

In another refinement, the mount assembly may further include a number of extension units necessary to create a desired distance between a cable harness and the support structure.

In another refinement, the clamp unit may comprise a clamp configured to clamp the cable harness to the modular mounting system.

In another refinement, the clamp may comprise an adjustable diameter configured to accommodate variations in cable harness diameters.

In another refinement, the clamp unit may be rotatable in angular increments with respect to a central axis of the modular mounting system.

In another refinement, the base unit, the extension unit, and the clamp unit may each be formed from injection-molded plastic.

In another refinement, each of the plurality of extension units may be connected to each other in a lockable male-female type connection arrangement.

In another refinement, a lowermost extension unit may be connected to the upper surface of the base unit by a lockable male-female type connection arrangement.

In another refinement, the clamp unit may be connected to an uppermost extension unit by a lockable male-female type connection arrangement.

In another refinement, the support structure may be a fan case.

In another refinement, the base unit may be adhesively bonded to the fan case.

In accordance with another aspect of the present disclosure, a gas turbine engine is disclosed. The gas turbine engine may comprise a fan case and a base unit having a surface. The gas turbine engine may further comprise an extension unit stacked on and connected to the surface and a clamp unit stacked on and connected to the extension unit.

In another refinement, the gas turbine engine may further include a plurality of extension units.

In another refinement, the clamp unit may comprise a clamp configured to clamp a cable harness.

In another refinement, the clamp may comprise an adjustable diameter configured to accommodate variations in cable harness diameters.

In another refinement, the clamp unit may be rotatable in angular increments with respect to the extension unit.

In another refinement, the base unit, the extension unit, and the clamp unit may each be formed from injection-molded plastic.

In accordance with another aspect of the present disclosure, a method for securing a cable harness to a support structure of a gas turbine engine is disclosed. The method may comprise bonding a base unit to an outer surface of the support structure and selecting a number (n) of extension units to fix the distance between the cable harness and the outer surface and the number (n) may be given by n≥0. The method may further comprise connecting the selected number (n) of extension units on a surface of the base unit. The method may further comprise connecting the clamp unit to an uppermost extension unit and clamping the cable harness in a clamp portion In another refinement, the method may further include rotating the clamp unit relative to the uppermost building block to a desired cable harness turning angle.

It should be understood that the drawings are not necessarily drawn to scale and that the disclosed embodiments are sometimes illustrated schematically and in partial views. It is to be further appreciated that the following detailed description is merely exemplary in nature and is not intended to limit the invention or the application and uses thereof. In this regard, it is to be additionally appreciated that the described embodiment is not limited to use in conjunction with a particular type of engine, a particular type of support structure, or a particular type of cable harness. Hence, although the present disclosure is, for convenience of explanation, depicted and described as certain illustrative embodiments, it will be appreciated that it can be implemented in various other types of embodiments and in various other systems and environments.

DETAILED DESCRIPTION

Figure 1:
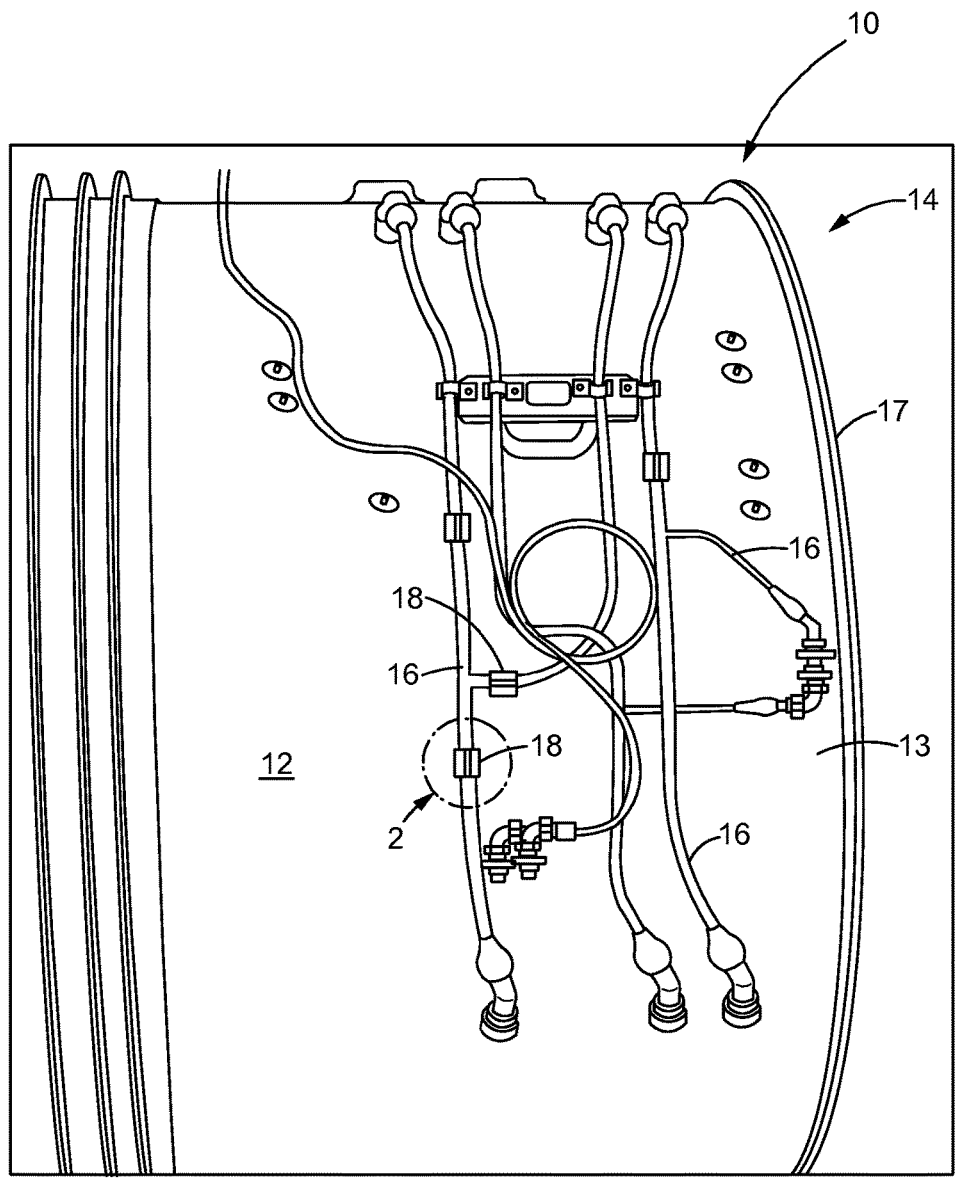
FIG. 1 is a side view of a cable harness routing configuration on an outer surface of a fan case of a gas turbine engine according to a first embodiment of the present disclosure.

Referring now to the drawings, and with specific reference to FIG. 1, a side view of a routing configuration 10 mounted on the outer surface 12 a support structure 13 of a gas turbine engine 14 is illustrated. Such a routing configuration 10 may be of a cable harness 16 or any other elongated member(s) requiring a mount to a surface. The routing configuration 10 may include at least one or a plurality of cable harnesses 16 that may be involved in transmitting power or input/output electrical signals required for the operation of an aircraft electrical system or the electrical system of a power generator if used in land-based operations. As shown, the support structure 13 may be a fan case 17 of the gas turbine engine 14, but other structures of the gas turbine engine 14 may serve this purpose and/or may cooperate with the fan case 17 in supporting the cable harnesses 16 in the routing configuration 10 (not shown).

The routing configuration 10 may be a pre-established pathway that guides the cable harnesses 16 to their designated terminals while providing sufficient clearance for other structures in the engine such that electrical signal integrity may always be preserved. Furthermore, the routing configuration 10 may serve to protect and secure the cable harnesses 16 against vibrations and assist in optimizing the usage of space in the gas turbine engine 14. The cable harnesses 16 may be of variable diameters and may be clustered in some regions and branched in other regions of the routing configuration 10, as shown.

Figure 2:
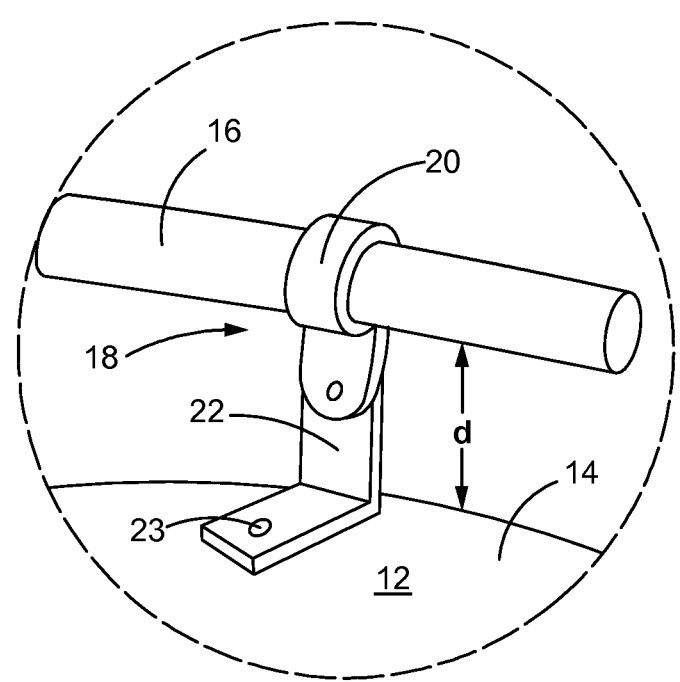
FIG. 2 is an enlarged view of area 2 of FIG. 1.

As depicted in FIG. 1, mounts 18 may be used to secure the cable harnesses 16 or other elongated members to the support structure 13 while positioning them at a sufficient distance from other engine structures according to clearance requirements. Furthermore, a plurality of mounts 18 may be required to meet the weight distribution requirements of the cable harnesses 16 (i.e., the requirement for a support for every unit length of the cable harness) as well as to support the cable harnesses 16 in the routing configuration 10. An exemplary structure for a mount 18 is illustrated in detail in FIG. 2, but other relatively similar mount structures may also serve this purpose. In general, the mounts 18 may include a clamp 20, a bracket 22, and bolts 23 to secure the cable harness 16 to the outer surface of the support structure 13. The clamp 20 may grasp the cable harness 16 and the bracket 22 may secure the cable harness 16 and the clamp 20 at a fixed distance, d, above the outer surface 12 of the support structure 13 in order to provide safe clearance for other structures in the engine 14. However, the distance requirements, d, for placement of the cable harnesses 16 may vary considerably depending on the location in the routing configuration 10. In addition, the diameters and the turning angles of the cable harnesses may also vary considerably depending on the specific location in the routing configuration 10. As such, the components of the mount 18 (i.e, the clamp 20 and the bracket 22) may be custom designed to accommodate these variations which may lead to undesirable increases in part design complexity, required part count, and associated costs.

Figure 3:
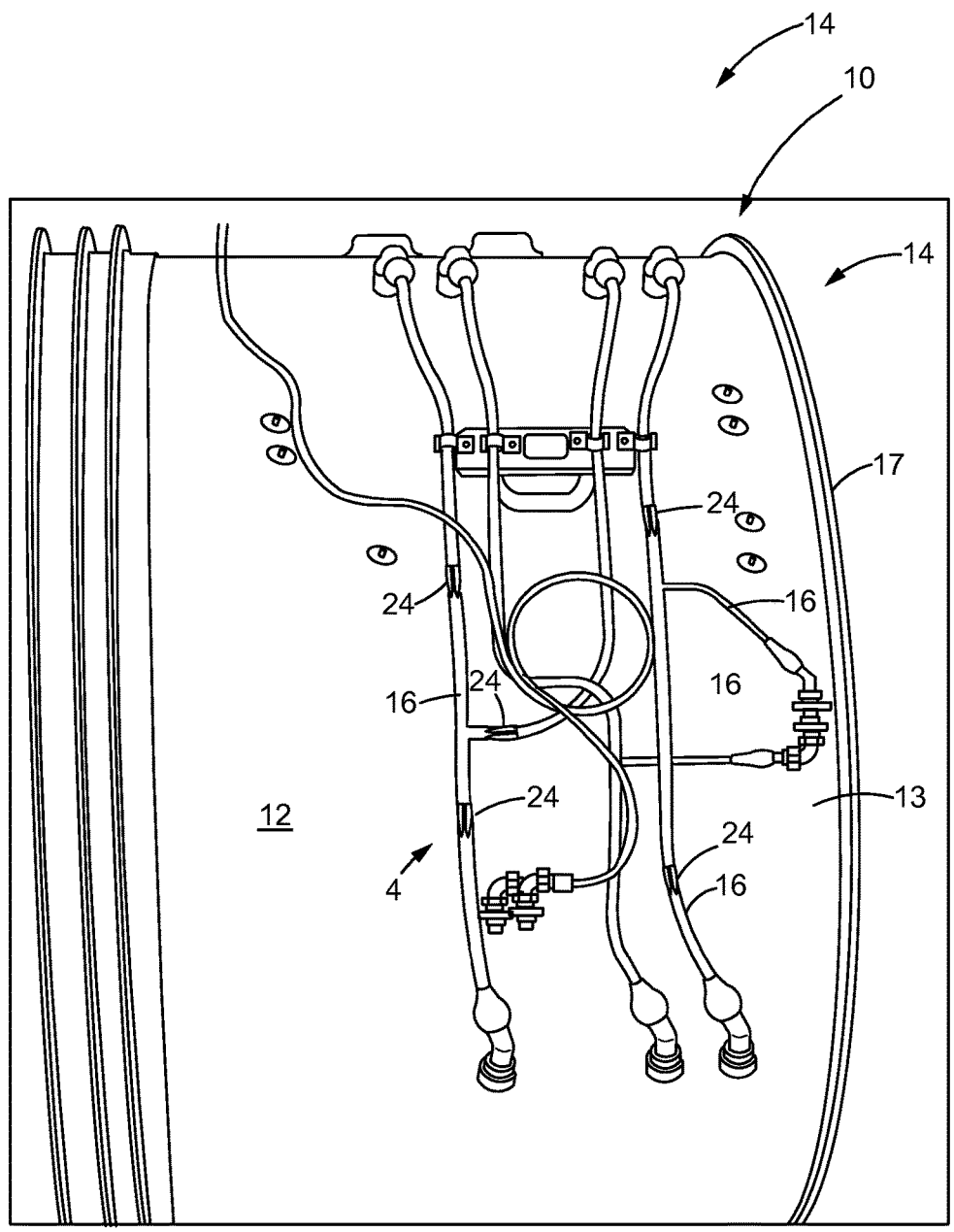
FIG. 3 is a side view of a cable harness routing configuration, illustrating the mounting of a cable harness with a modular mount assembly, constructed in accordance with a second embodiment of the present disclosure.
Figure 4:
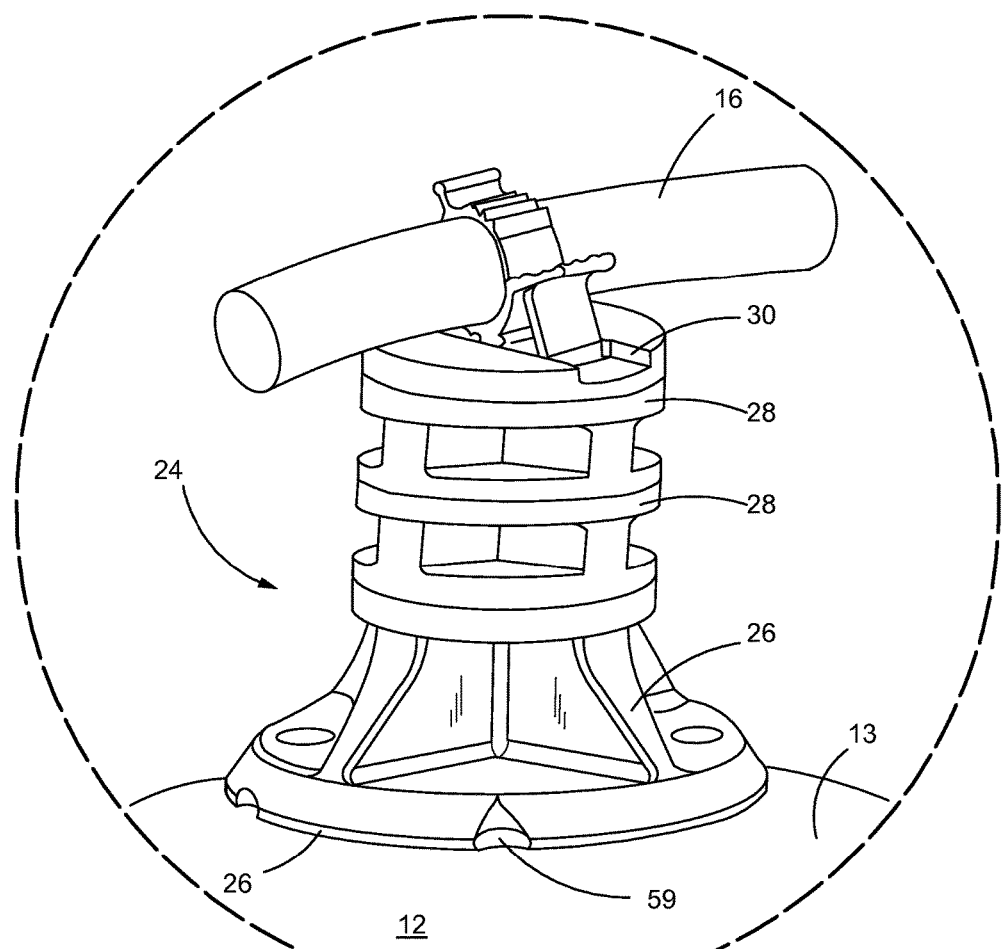
FIG. 4 is an enlarged view of area 4 of FIG. 3.
Figure 5:
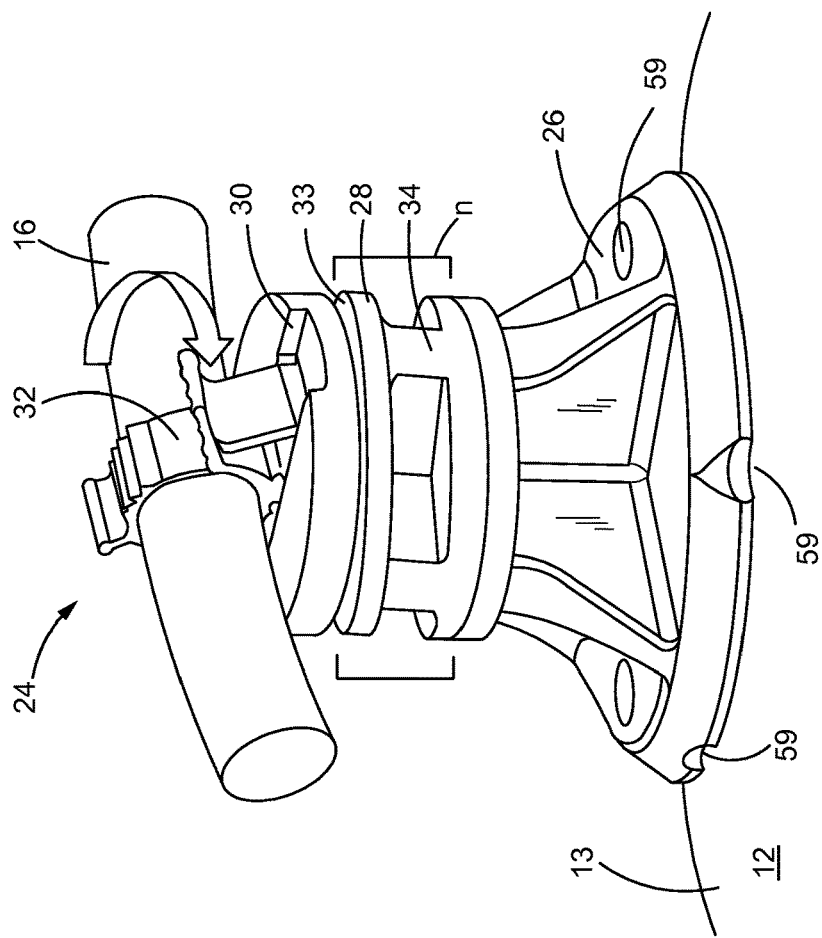
FIG. 5 is a perspective view of the modular mount assembly constructed in accordance with the present disclosure.

In order to simplify the cable harness mounting arrangement in the routing configuration 10 and to reduce part complexity, number count, and costs required for the cable harness mounts, a modular mount assembly 24 assembled from a base unit 26, zero or more stackable extension units 28, and a distal clamp 30 may be provided to secure the cable harnesses 16 to the outer surface of the support structure 13 (see FIGS. 3-5). Selective use of any number of the extension units 28, between the base unit 26 and the clamp unit 30, permits the design engineer to adjust the cable harness securing arrangement according to varying clearance requirements, varying cable harness turning angles, and varying cable harness diameters without the need for additional complex and/or custom-designed mounting parts (see detailed discussion below).

Figure 6:
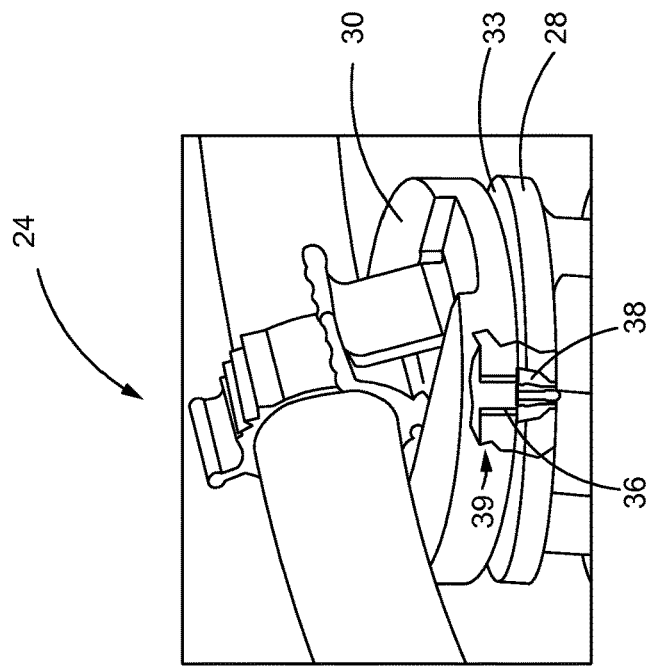
FIG. 6 is an enlarged perspective of FIG. 5, partially cut-away to illustrate a connection arrangement for connecting the building blocks of the modular mount assembly, constructed in accordance with the present disclosure.

When fully assembled, the modular mount assembly 24 may consist of the base unit 26 bonded to the outer surface 12 of the support structure 13 and a variable number (n) of the extension units 28 stacked on the base unit 26 and extending from the outer surface 12 of the support structure 13, as best shown in FIG. 5. A lowermost extension unit 34 may be connected to the base unit 26 and each of the variable number (n) of extension units 28 may also be connected to each other (also see FIG. 7). The modular mount assembly 24 may further consist of the clamp unit 30 connected to an uppermost building block 33 (either an extension unit 28 or the base unit 26 if n=0). Notably, each of the extension units 28 may be connected to each other by at least one lockable male-female type connection arrangement 39 (see FIG. 6), such that the modular mount assembly 24, once assembled, will not easily dissociate or separate.

The base unit 26 of the modular mount assembly 24 may bond to the outer surface 12 of the support structure 13 in order to anchor the modular mount assembly 24 and the cable harness 16 to the support structure, as shown in FIG. 3. The base unit 26 may adhesively bond to the outer surface 12 of the support structure 13 with a suitable vibration-resistant adhesive that is stable within the operating range of the support structure 13. If the support structure 13 is the fan case 17, the adhesive may be stable at the service range typical of the fan case outer surface (typically below about 200° F.). In this regard, suitable adhesives may include epoxy paste adhesives which may be stable up to about 200° F. to about 250° F., elastomeric adhesives, polysulfide adhesives, or other adhesives capable of withstanding the temperature of the environment at the outer surface of the fan case 17. Notably, the temperature stability of the chosen adhesive, as well as the temperature stability of the materials forming the building blocks of the modular mount assembly 24, may restrict the placement of the modular mount assembly 24 to certain compatible temperature zones in the gas turbine engine. For example, if an epoxy paste adhesive is chosen, the placement of the mount assembly 24 in the engine may be restricted to support structures having relatively low temperatures (below about 200° F.) near their surfaces, such as the outer surface 12 of the fan case 17. As another alternative arrangement, the base unit 26 may be anchored to the outer surface 12 of the support structure 13 by mechanical fastening such that the mount assembly 24 may be placed on support structures located in higher temperature zones of the engine, provided, of course, that the materials forming the mount assembly are also stable at the higher temperatures.

The user may select the number (n) of extension units 28 for incorporation into the modular mount assembly 24 in order to adjust the distance, d, between the cable harness 16 and the outer surface 12 of the support structure 13 for in order to satisfy any cable harness clearance requirements. The incorporation of the extension units 28 into the modular mount assembly 24 may be optional such that the number, n, of extension units 28 in the modular mount assembly 24 may be defined by the equation n≥0. The extension units 28 may have identical structures and may be connectable with each other to allow the user or design engineer to build the desired height of the assembly according to clearance standards (see FIG. 7). The height of the mount assembly 24 may be variable between about one inch and about seven inches by adjusting the number (n) of the extension units 28. Of course, the height of the stack of building blocks 31 may be made even higher if clearance within the engine 14 so allows.

The clamp unit 30 may consist of a clamp portion 32 that may clamp the cable harness 16, as best shown in FIG. 5. Importantly, the clamp unit 30 may also be rotatable in angular increments with respect to the uppermost building block 33, thereby allowing the user to accommodate varying cable harness turning angles in the routing configuration 10 (see FIG. 7 and further details below).

Figure 7:
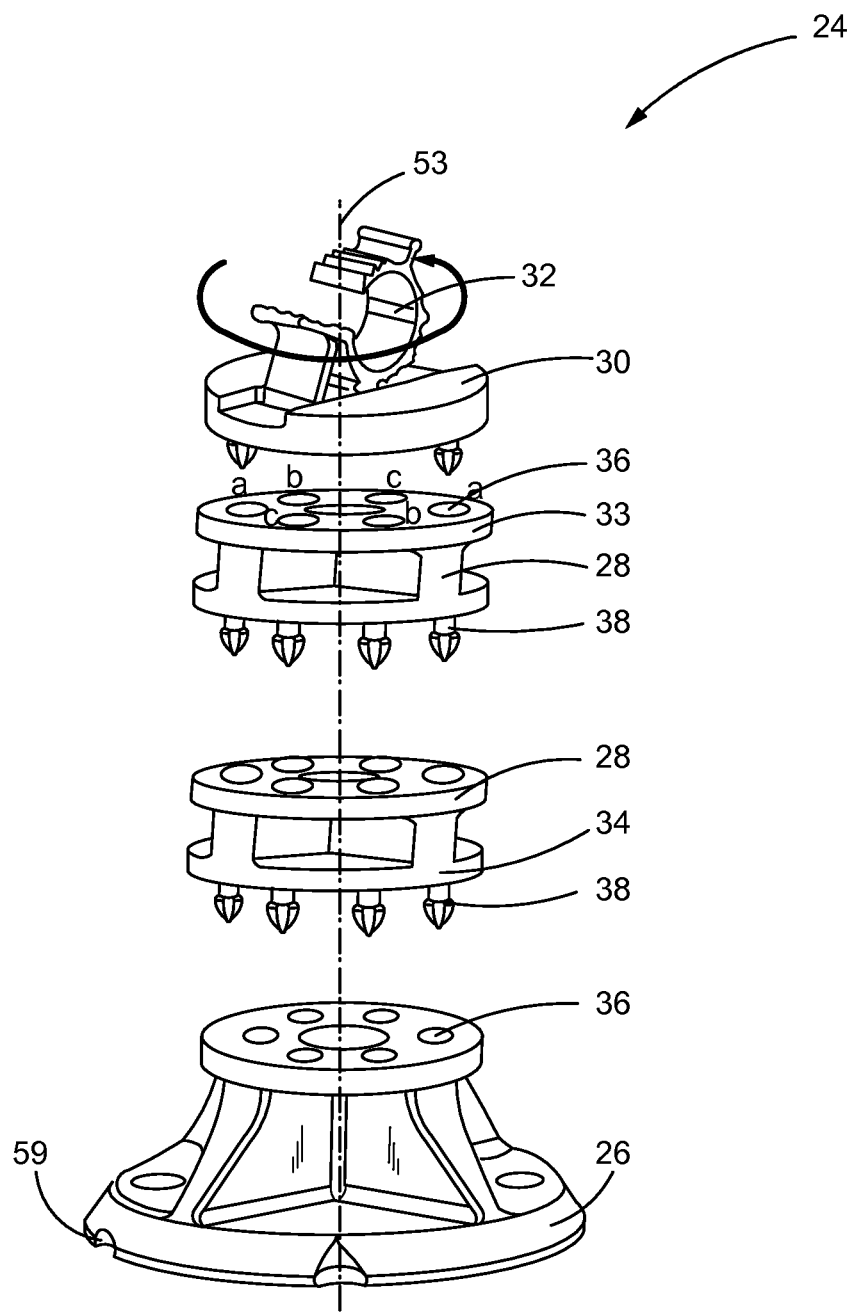
FIG. 7 is an exploded view of the modular mount assembly constructed in accordance with the present disclosure.
Figure 8:
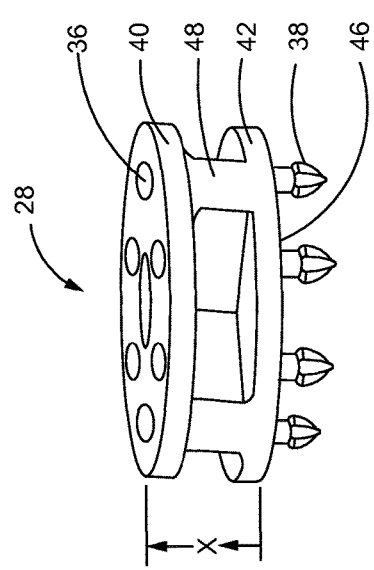
FIG. 8 is a front perspective view of an extension unit of the modular mount assembly constructed in accordance with the present disclosure.

More detailed views of each of the building blocks of the modular mount assembly 24 are shown in FIGS. 6-10. As best shown in FIG. 7 and FIG. 8, the extension unit 28 may have at least one or a plurality of receiver apertures 36 each configured to receive a corresponding one of male connectors 38 of either another extension unit 28 or the clamp unit 30 in a lockable male-female type connection arrangement 39, as shown in detail in FIG. 6, but other types of connection arrangements may also be used. In addition, the extension unit 28 may have at least one or a plurality of male connectors 38 each configured to connect to a respective one of the receiver apertures 36 of either another extension unit 28 or the base unit 26 via the male-female type connection 39 depicted in FIG. 6. The extension unit 28 may have six receiver apertures 36 equally spaced in a circular arrangement about an upper surface 44 of an upper portion 40 and six male connectors 38 spaced in an identical circular arrangement about a lower surface 46 of a lower portion 42, as shown. However, other numbers and spatial arrangements of the receiver apertures 36 and the male connectors 38 may also be provided as long as their respective spatial arrangements on the upper portion 40 and the lower portion 42 are consistent with each other to allow a stackable assembly. Furthermore, the extension unit 28 may be configured to connect to other extension units 28, the base unit 26, and the clamp unit 26 by other alternative connection arrangements than those shown in FIGS. 6 and 7.

The extension unit 28 may have a generally cylindrical frame with the upper surface 44 and the lower surface 46 each having a circular shape, as best shown in FIG. 8. Furthermore, the extension unit 28 may have a diameter of about one inch and a thickness, x, measured from the upper surface 44 to the lower surface 46, in the range of about half of an inch to an inch. However, other shapes (such as square, rectangular, etc.) and other dimensions of the extension unit may also be provided.

The extension unit 28 may be formed from injection molded plastic with co-molded metallic (such as steel) or plastic male connectors 38. Suitable plastic materials for the extension unit 28 may be polyether imide, polyether imide filled with glass or carbon particles and resin to provide enhanced material strength and stability, other thermoplastics with similar mechanical characteristics, or other plastics. As another alternative arrangement, a body portion 48 of the extension unit 28 and the male connectors 38 of the extension unit 28 may be formed separately from injection molded plastic (or metal for the male connectors 38) and may be subsequently attached to each other.

Figure 9:
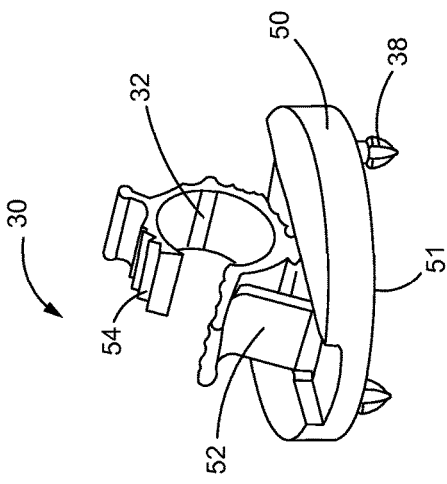
FIG. 9 is a front perspective view of a clamp unit of the modular mount assembly constructed in accordance with the present disclosure.

The clamp unit 30 may have a circular disc-like base portion 50, as best shown in FIG. 9, or another shape, and may be configured to connect to the uppermost building block 33 (either the extension unit 28 or the base unit 26 if n=0). More specifically, the clamp unit 30 may have at least one or more male connectors 38 extending from a bottom surface 51 of the base portion 50, and each of the male connectors 38 may be configured to be received by a respective one of the receiver apertures 36 of the uppermost building block 33 by the lockable male-female type connection arrangement 39 depicted in FIG. 6. More specifically, the clamp unit 30 may have two male connectors 38 each configured to be received by a respective one of two co-axial receiver apertures 36 of the uppermost building block 33, as best shown in FIG. 7. Alternatively, the clamp unit 30 may have other numbers of male connectors 38 and/or may have different spatial arrangements from those depicted in FIGS. 7 and 9. Furthermore, the clamp unit 30 may be configured to connect with the uppermost building block 33 by another type of connection arrangement.

Referring now to FIG. 7, the clamp unit 30 may be rotatable in angular increments with respect to a central axis 53 of the modular mount assembly 24 in order to accommodate any required turning angles of the cable harness 16 in the routing configuration 10. If, for example, the uppermost building block 33 has six receiver apertures evenly spaced in a circular arrangement about its upper surface, as shown in FIG. 7, then the clamp unit 30 may be rotatable in angular increments of 60° with respect to the central axis 53. More specifically, the clamp unit 30 may be rotated by 60° with respect to the central axis 53 by shifting the orientation of its male connectors 38 from alignment with co-axial receiver apertures a-a of the extension unit 28 to alignment with co-axial receiver apertures c-c. The male connectors 38 may then be inserted into the receiver apertures c-c to lock the clamp unit 30 in the desired angular orientation. As can be appreciated, more fine adjustments (smaller angular increments) or less fine adjustments (larger angular increments) in the turning angles of the clamp unit 30 with respect to the central axis 53 may be provided by varying the number and spatial orientation of the receiver apertures 36 on the upper surface of the uppermost building block 33.

The clamp portion 32 of the clamp unit 30 may have an adjustable diameter for accommodating varying diameters of the cable harnesses 16. In particular, as best shown in FIG. 9, the clamp portion 32 may have a releasable latch 52 for opening of the clamp portion 32 to allow insertion or removal of the cable harness 16. Furthermore, the clamp portion 32 may also have an adjustable locking feature 54 that may allow the latch 52 to close and lock at various positions on the clamp portion 32 in order to adjust the diameter of the clamp portion 32 according to the diameter of the cable harness 16. When closed, the clamp portion 32 may have diameters that may range from about one-eighth of an inch to about two inches, but other diameters may also be provided. As an alternative arrangement, detachable clamp portions 32 each having different fixed diameters may be provided, allowing the user or design engineer to select and attach the clamp portion 32 having the desired clamp diameter. As another alternative arrangement, a set of clamp units 30 having permanently attached clamp portions 32 of different fixed diameters may be provided and the user may select the appropriate the clamp unit 30 having the desired clamp diameter when building the modular mount assembly 24.

The clamp unit 30 may be a unitary structure formed from injection molded plastic with co-molded metallic or plastic male connectors 38. Alternatively, the base portion 50, the clamp portion 32, and the male connectors 38 may be each be formed individually from injection molded plastic (or metal for the male connectors 38) and may be attached to each other to form the clamp unit 30. As another alternative arrangement, the base portion 50 and the clamp portion 32 may be formed as a single unit from injection molded plastic and the male connectors 38 may be formed separately from injection molded plastic (or metal) and the male connectors 38 may be subsequently attached to the base portion/clamp portion unit.

Figure 10:
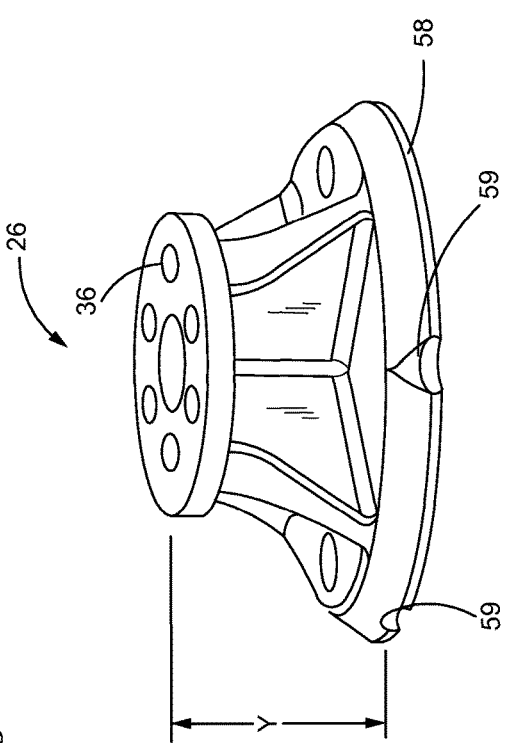
FIG. 10 is a front perspective view of a base unit of the modular mount assembly constructed in accordance with the present disclosure.

As shown in FIG. 10, the base unit 26 may have at least one or more receiver apertures 36 equally spaced in a circular arrangement about an upper surface 56. There may be six receiver apertures 36 each configured to receive a respective one of the male connectors 38 of either the extension unit 28 or the clamp unit 30 by the lockable male-female connection 39 depicted in FIG. 6. Other numbers and spatial arrangements of the receiver apertures 36 of the base unit 26 may also suffice as long as the numbers and/or spatial arrangements of the male connectors 38 of the extension unit 28 and the clamp unit 30 are also designed to form a compatible arrangement. In addition, the base unit 26 may be configured to connect with the extension unit 28 and the clamp unit 30 by an alternative connection arrangement than those depicted in FIGS. 6 and 7.

The bottom surface 58 of the base unit 26 may have features to facilitate bonding to the outer surface 12 of the support structure 13 to improve bond line uniformity and improve shear strength of the adhesive. For example, the bottom surface 58 may have a larger surface area than the upper surface 56, as shown. Specifically, the diameter of the upper surface 56 may be about one inch and the diameter of the bottom surface 58 may be about two and a half inches, but other respective diameters may also be provided. In addition, the bottom surface 58 may be abraded, roughened, or otherwise texturized to facilitate bonding to the outer surface 12 of the support structure 13. Moreover, curvature may be introduced into the bottom surface 58 to match the curvature of the outer surface 12 of the support structure 13 to even further facilitate bonding.

The base unit 26 may be formed as a single unit from injection molded plastic. In addition, because the injection molded material may accumulate pressure at high altitudes during flight, the adhesive layer between the base unit 26 and the support structure 13 may have one or more vents 59 to allow the escape of air in order to prevent strain on the bond between the base unit 26 and support structure 13 if molded pocket are present in base which are isolated from surrounding air.

Figure 11:
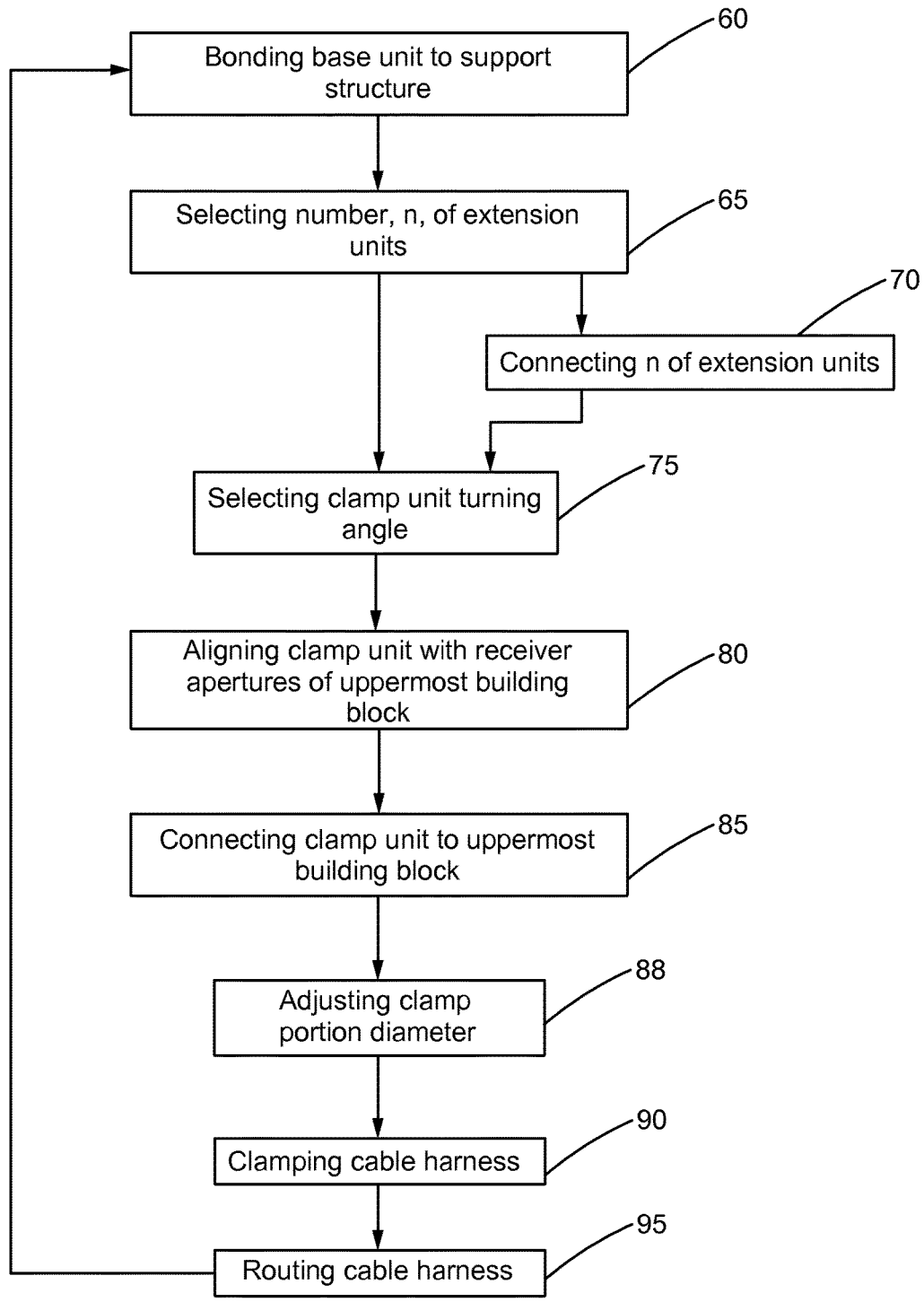
FIG. 11 is flow chart illustrating steps involved in building the modular mount assembly, in accordance with the present disclosure.

FIG. 11 illustrates the steps which may be involved in building the modular mount assembly 24 as performed by a user when installing the routing configuration 10 in a gas turbine engine. According to a block 60, the user may bond the base unit 26 to the outer surface 12 of a support structure 13 that is operating at a temperature compatible with the selected bonding adhesive and/or the materials forming the building blocks of the modular mount assembly 24. If, however, mechanical fastening is used to bond the base unit 26 to the support structure 13, the bond unit 26 may have greater versatility as to where it may be bonded in the engine as temperature sensitivity may be reduced.

The number (n) of the extension units 28 required to fix the distance, d, between the cable harness 16 and the support structure 13 according to clearance requirements may then be selected according to a block 65, as shown. According to a next block 70, the selected number of extension units 28 may then be connected to each other in a stack on the upper surface 56 of the base unit 26 and to provide the desired distance, d, between the cable harness 16 and the support structure 13 (see FIG. 5). According to a next block 75, the user may select the desired turning angle of the clamp unit 30 required to accommodate any turning angles of the cable harness 16 in the routing configuration 10. The user may then appropriately align the male connectors 38 of the clamp portion 30 with the receiver apertures 36 of the uppermost building block 33 such that the clamp unit 30 is oriented at the selected turning angle (see FIG. 7), according to a block 80. The clamp unit 30 may then be connected to the uppermost building block 33 with the clamp unit 30 oriented at the selected turning angle according to a block 85. The diameter of the clamp portion 32 may be adjusted to accommodate the diameter of the cable harness 16 and the cable harness 16 may then be clamped by the clamp portion 32 according to a block 88 and a block 90, respectively, as shown. It should be noted that the sequence of steps for the mount assembly construction illustrated in FIG. 11 is exemplary and may be performed in various different orders from those shown.

Following the construction of the modular mount assembly 24, the cable harness 16 may be routed to the next position in the routing configuration 10, either on the fan case 17 or another support structure, according to a block 95. If the temperature of the environment on the surface of the support structure 13 at the next securing position is compatible with the adhesive and/or materials of the building blocks, then another modular mount assembly 24 may be constructed to secure the cable harness 16 to the support structure at the next position in the routing configuration according to the blocks 60, 65, 70, 75, 80, 85, 88, and 90, as shown. However, if the temperature of the environment is not compatible with the adhesive and/or the building block materials, another type of securing mount may be used to secure the cable harness 16 at the next securing position. In this way, several modular mount assemblies 24 may work together and/or in conjunction with other securing mount structures to support the cable harnesses 16 in the routing configuration 10.

Finally, it should be emphasized that the modular mount assembly 24 as disclosed herein has been described for securing cable harnesses to support structures in gas turbine engines, but may also be employed for securing and mounting cable harnesses on support structures in other types of engines or systems as well. In addition, the modular mount assembly 24 may be adapted for mounting various other objects besides cable harnesses on support structures.

INDUSTRIAL APPLICABILITY

In general, it can therefore be seen that the technology disclosed herein has industrial applicability in a variety of settings including, but not limited to, cable harness routing in gas turbine engines. The modular mount assembly as disclosed herein provides basic building blocks that allow the user or design engineer to build-up and customize the cable harness mount assembly arrangement according to varying cable harness clearance requirements, cable harness diameters, and cable harness turning angles without the requirement for additional complex and expensive custom-fabricated parts. Accordingly, the modular mount assembly may provide desirable reductions in part count and costs for mounting components required for cable harness routing in gas turbine engines.

While only certain embodiments have been set forth, alternative embodiments and various modifications will be apparent from the above descriptions to those skilled in the art. These and other alternatives are considered equivalents and within the spirit and scope of this disclosure.

What is claimed is:

1. A mount assembly for mounting a cable harness to a component of a gas turbine engine, the mount assembly comprising:
  a base unit having a bottom surface for attachment to the component and an upper surface opposite the bottom surface, a first plurality of receiver apertures located in the upper surface, the first plurality of receiver apertures having a circular arrangement,
  a clamp unit having a clamp portion for clamping the cable harness and a first plurality of connectors configured to be received within the first plurality of receiver apertures when the clamp is secured to the base unit, and
  an extension unit having:
    an upper surface that includes a second plurality of receiving apertures configured to receive the first plurality of connectors when the extension unit is disposed between the clamp unit and the base unit, and
    a bottom surface opposite the upper surface that includes a second plurality of connectors configured to be received within the first plurality of receiver apertures when the extension unit is disposed between the camp unit and the base unit.

2. The mount assembly of claim 1, further including a plurality of extension units disposed between the base unit and the clamp unit.

3. The mount assembly of claim 1, wherein the clamp portion is a c-clamp configured to clamp the cable harness to the component.

4. The mount assembly of claim 1, wherein the base unit, the extension unit, and the clamp unit are each formed from injection molded plastic.

5. The mount assembly of claim 1, wherein the base unit is adhesively bonded to the component.

6. The mount assembly of claim 2, wherein the plurality of extension units are connected to each other in a lockable male-female type connection arrangement.

7. The mount assembly of claim 3, wherein the clamp portion comprises an adjustable diameter configured to accommodate variations in cable harness diameters.

8. The mount assembly of claim 6, wherein the connectors and receiver apertures interconnect in a lockable male-female type connection arrangement.

9. A mount assembly for mounting a cable harness to a component of a gas turbine engine, the mount assembly comprising:
  a base unit having a bottom surface for attachment to the component and an upper surface opposite the bottom surface, a first plurality of receiver apertures located in the upper surface, the first plurality of receiver apertures having a circular arrangement,
  a clamp unit having a clamp portion for clamping the cable harness and a first plurality of connectors configured to be received within the first plurality of receiver apertures when the clamp is secured to the base unit, wherein the clamp unit is rotatable in angular increments with respect to a central axis of the mount assembly.

10. A gas turbine engine, comprising:
a mount assembly for mounting a cable harness to a component of the gas turbine engine, the mount assembly comprising:
a base unit having a bottom surface for attachment to the component and an upper surface opposite the bottom surface, a first plurality of receiver apertures located in the upper surface, the first plurality of receiver apertures having a circular arrangement,
a clamp unit having a clamp portion for clamping the cable harness and a first plurality of connectors configured to be received within the first plurality of receiver apertures when the clamp is secured to the base unit, and
an extension unit having:
an upper surface that includes a second plurality of receiving apertures configured to receive the first plurality of connectors when the extension unit is disposed between the clamp unit and the base unit, and
a bottom surface opposite the upper surface that includes a second plurality of connectors configured to be received within the first plurality of receiver apertures when the extension unit is disposed between the camp unit and the base unit.

11. The gas turbine engine of claim 10, wherein the clamp portion is a c-clamp configured to clamp a cable harness to the component.

12. The gas turbine engine of claim 11, wherein the clamp portion comprises n an adjustable diameter configured to accommodate variations in cable harness diameters.

13. The gas turbine engine of claim 11, wherein the clamp unit is rotatable in angular increments with respect to the extension unit.

14. The gas turbine engine of claim 13, wherein the base unit, the extension unit, and the clamp unit each formed from injection-molded plastic.

15. A method for securing a cable harness to a component of a gas turbine engine, comprising:
determining a first distance from the component at which the cable harness is to be secured,
connecting a base unit to the component, the base unit having a bottom surface for attachment to the component and an upper surface opposite the bottom surface, a first plurality of receiver apertures located in the upper surface, the first plurality of receiver apertures having a circular arrangement,
securing a clamp unit to the cable harness and the base unit, the clamp unit having a clamp portion for clamping the cable harness and a first plurality of connectors configured to be received within the first plurality of receiver apertures when the clamp is secured to the base unit, and
securing an extension unit between the base unit and the clamp unit, the extension unit having:
an upper surface that includes a second plurality of receiving apertures configured to receive the first plurality of connectors when the extension unit is disposed between the clamp unit and the base unit, and
a bottom surface opposite the upper surface that includes a second plurality of connectors configured to be received within the first plurality of receiver apertures when the extension unit is disposed between the camp unit and the base unit.

* * * * *